J. KLETTI, III.
CIGAR MAKER'S ROLLING BOARD.
APPLICATION FILED FEB. 11, 1910.

960,957.

Patented June 7, 1910.

WITNESSES:

INVENTOR
Johann Kletti III
BY B. Singer
ATTORNEYS

UNITED STATES PATENT OFFICE.

JOHANN KLETTI, III, OF SANDHAUSEN, GERMANY.

CIGAR-MAKER'S ROLLING-BOARD.

960,957.  Specification of Letters Patent.  Patented June 7, 1910.

Application filed February 11, 1910. Serial No. 543,404.

*To all whom it may concern:*

Be it known that I, JOHANN KLETTI, III, a subject of the German Emperor, and a resident of Sandhausen, in the Grand-Duchy of Badenia, Germany, have invented certain new and useful Improvements in Cigar-Makers' Rolling-Boards, of which the following is a full, clear, and exact specification.

The subject of this invention is cigar makers' rolling boards, of that kind of rolling-boards which form the lid of a receptacle divided by a strainer into two compartments, of which one serves as a receptacle for fluids and the one above it as a collecting-room for the leaves to be treated, in order to keep the same automatically in a constantly uniform state of dampness as required for working the leaves, without bringing them into contact with water.

According to the invention there is arranged a special receptacle in the inside of the space serving to receive the fluid, which receptacle can be taken out and is at the top closed by the strainer and contains the fluid to be used. By this arrangement it is possible to easily renew the fluid used in the said rolling-board receptacle.

The invention is illustrated in the accompanying drawing in a simple form of construction.

Figure 1:
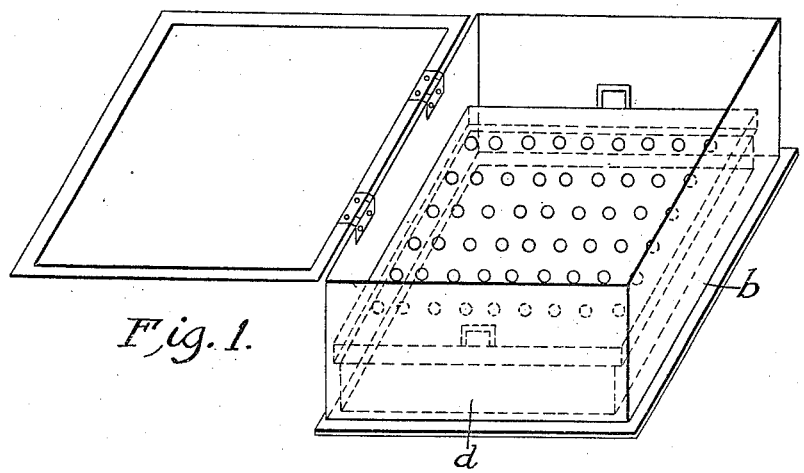
Figure 2:
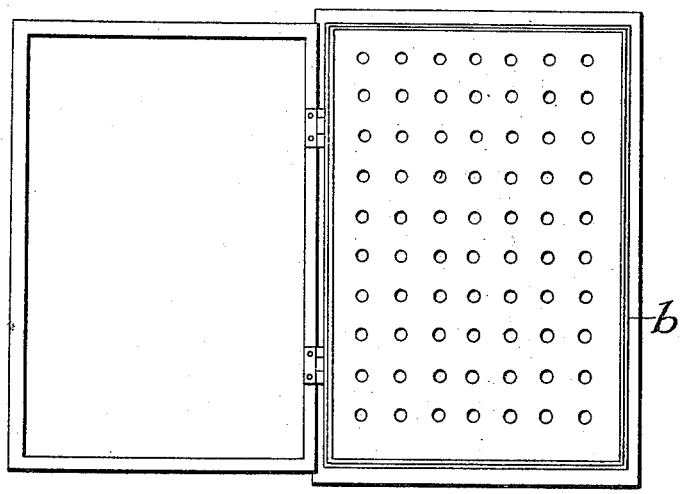
Figure 3:
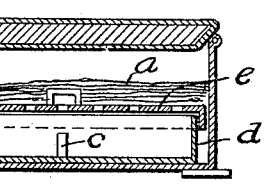
Figure 4:
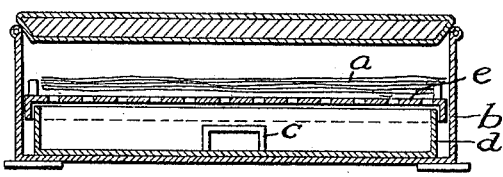

Figure 1 is a perspective view, Fig. 2 shows the same opened, in a top-view, Fig. 3 in a vertical cross section and Fig. 4 in a vertical longitudinal section.

Similar letters refer to similar parts throughout the several views.

In order to be able to easily renew in the receptacle $b$ the fluid serving to keep the outside leaves $a$ in a limp state, there has been inserted into the said receptacle a special removable receptacle $d$ with a handle $c$ which carries at the top the strainer $e$ serving to receive the outside leaves.

What I claim as my invention and desire to secure by United States Letters Patent is:

Cigar-maker's rolling board, comprising a receptacle having a lid adapted to serve as rolling board, a second receptacle movable within the first for the reception of the moistening fluid, provided with a handle and a strainer upon the said receptacle carrying the cover leaves to be moistened, substantially as described.

In testimony whereof I affix my signature in presence of two witnesses.

JOH. KLETTI, III.

Witnesses:
 ERNEST L. IVES,
 W. W. SCHMIDT.